(12) United States Patent
Johnson

(10) Patent No.: US 6,184,795 B1
(45) Date of Patent: *Feb. 6, 2001

(54) MOTOR CONTROLLER HAVING DEAD ENDED WINDING DETECTION CAPABILITY ON A SINGLE PHASE LINE

(75) Inventor: Lynn Stewart Johnson, Aurora, IL (US)

(73) Assignee: Siemens Energy & Automation, Inc., Alpharetta, GA (US)

( * ) Notice: Under 35 U.S.C. 154(b), the term of this patent shall be extended for 0 days.

This patent is subject to a terminal disclaimer.

(21) Appl. No.: 09/164,873

(22) Filed: Oct. 2, 1998

(51) Int. Cl.[7] .................................................. G01B 31/02
(52) U.S. Cl. .................... 340/648; 340/649; 318/490; 318/729; 361/23
(58) Field of Search ................................ 340/648, 649, 340/644; 318/490, 434, 729, 767, 798; 361/28, 33, 30, 31, 23, 88; 324/772

(56) References Cited

U.S. PATENT DOCUMENTS

| 4,384,243 | * | 5/1983 | Mskovac | 318/729 |
| 5,153,489 | * | 10/1992 | Unsworth et al. | 318/490 |
| 5,574,346 | * | 11/1996 | Chavan et al. | 318/434 |
| 5,945,797 | * | 8/1999 | Johnson | 318/490 |

* cited by examiner

*Primary Examiner*—Edward Lefkowitz
*Assistant Examiner*—Davetta W. Goins

(57) ABSTRACT

Problems associated with delta motors and motor controllers being subjected to the potentially damaging combination of extremely low motor torque and very high overcurrent conditions resulting from a single dead ended motor winding are eliminated in a motor controller that automatically inhibits operation of the delta motor upon detecting that the two leads of a single motor winding have both been connected to the supply lines for a single phase of a three phase power source.

13 Claims, 7 Drawing Sheets

FROM UTILITY POWER L1-L2

FROM UTILITY POWER L2-L3

FROM UTILITY POWER L3-L1

(L1-T1=0)

(L2-T2>0)

(L3-T3>0)

(L1-T1>0)

(L2-T2=0)

(L3-T3>0)

(L1-T1>0)

(L2-T2>0)

(L3-T3=0)

MOTOR CONTROLLER HAVING DEAD ENDED WINDING DETECTION CAPABILITY ON A SINGLE PHASE LINE

FIELD OF THE INVENTION

This invention relates to motor controllers, and more particularly, to a controller for a delta motor that automatically detects when the two leads of a single motor winding are connected to the supply lines for a single phase of a three phase power source.

BACKGROUND OF THE INVENTION

A delta motor system typically includes a delta motor, a three phase power source and a motor controller. During start up, delta motors often experience potentially damaging high inrush currents and starting torques. This can adversely effect the performance of the motor drive and increase general wear and tear leading to higher maintenance costs. In addition, current peaks during motor startup can also cause voltage disturbances in the power supply.

Motor controllers are typically used to restrict the motor torque and reduce the high starting currents by controlling the application of voltage from the three phase power source to the delta motor. The motor controller generally includes a set of three control switches that are connected between the line voltage terminals of the three phase power source and each of the windings of the delta motor. The motor controller regulates the voltage from the three phase power source to the delta motor by selectively opening and closing the three control switches. The proper operation of the delta motor is dependent on the proper regulation of the control switches.

The motor controller's internal timing mechanisms are specifically designed to regulate the application of specific line voltages from the three phase power source to specific delta motor windings based on a predesignated wiring configuration. Conventional electrical leads are typically used to connect the delta motor windings to the control switches and to the line voltage terminals. Since the electrical leads providing connection to the delta motor terminals are not always clearly marked, mistakes in wiring the delta motor system are not uncommon.

A common wiring error where the two leads providing connection to a single winding are electrically coupled to a single line voltage terminal while the other two windings are connected in parallel across the remaining two line voltages terminals, is known as a single dead ended winding wiring configuration. In this configuration, the dead ended winding does not have any current flowing through it while the other two windings are subjected to lower motor torque and significantly higher current conditions. The lower motor torque in combination with the higher operating current can potentially damage both the delta motor and the motor controller.

Clearly it would be desirable to use a motor controller that automatically detects a single dead ended winding configuration so that the faulty wiring can be corrected prior to subjecting the delta motor and motor controller to the potentially damaging combination of low motor torque and high operating currents. The present invention seeks to achieve these objectives.

SUMMARY OF THE INVENTION

It is a principal object of this invention to provide a new and improved motor controller that automatically detects a fault condition when the two leads of a single motor winding have been connected to the supply lines of a single phase of a three phase power source. More specifically, it is an object of the invention to provide a motor controller that detects the fault condition prior to starting the delta motor so that the faulty wiring can be corrected prior to subjecting the delta motor and the motor controller to the potentially damaging combination of low motor torque and high operating currents.

An exemplary embodiment of the invention achieves the foregoing object in a motor controller for use in a motor system that includes a multiphase power source having three supply lines and a delta motor having three windings, each winding having a first lead and a second lead, where the first lead of each winding is intended for connection to a selected supply line.

The motor controller includes a plurality of switching means and an error detecting means. Each of the switching means is intended for connection between selected supply lines and the second leads of selected windings. The error detecting means is connected across each of the switching means and is operable to detect a fault condition if both the first and second leads of one of the windings are connected to a single one of the supply lines. An indicating means may be connected to the error detecting means for generating an indication in response to the fault condition.

In one embodiment, the plurality of switching means comprise solid state devices.

In another embodiment, the plurality of switching mean comprise SCRs or triacs.

In another form of the invention, the error detecting means may include a sensing means that is operably connected across each of the switching means and is operable to generate a plurality of outputs representative of the voltages across each of the switching means.

The error detecting means may also include a decoding means, connected to the sensing means, for detecting the fault condition. The decoding means identifies the fault condition if the voltages across the second and third switching means are synchronously both greater than or less than zero and the voltage across the first switching means is equal to zero; or if the voltages across the first and third switching means are synchronously both greater than or less than zero and the voltage across the second switching means is equal to zero; or if the voltage across the first and second switching means are synchronously both greater than or less than zero and the voltage across the third switching means is equal to zero.

Other objects and advantages of the invention will become apparent from the following specification taken in conjunction with the accompanying drawings.

DETAILED DESCRIPTION OF THE PREFERRED EMBODIMENT

Figure 1:
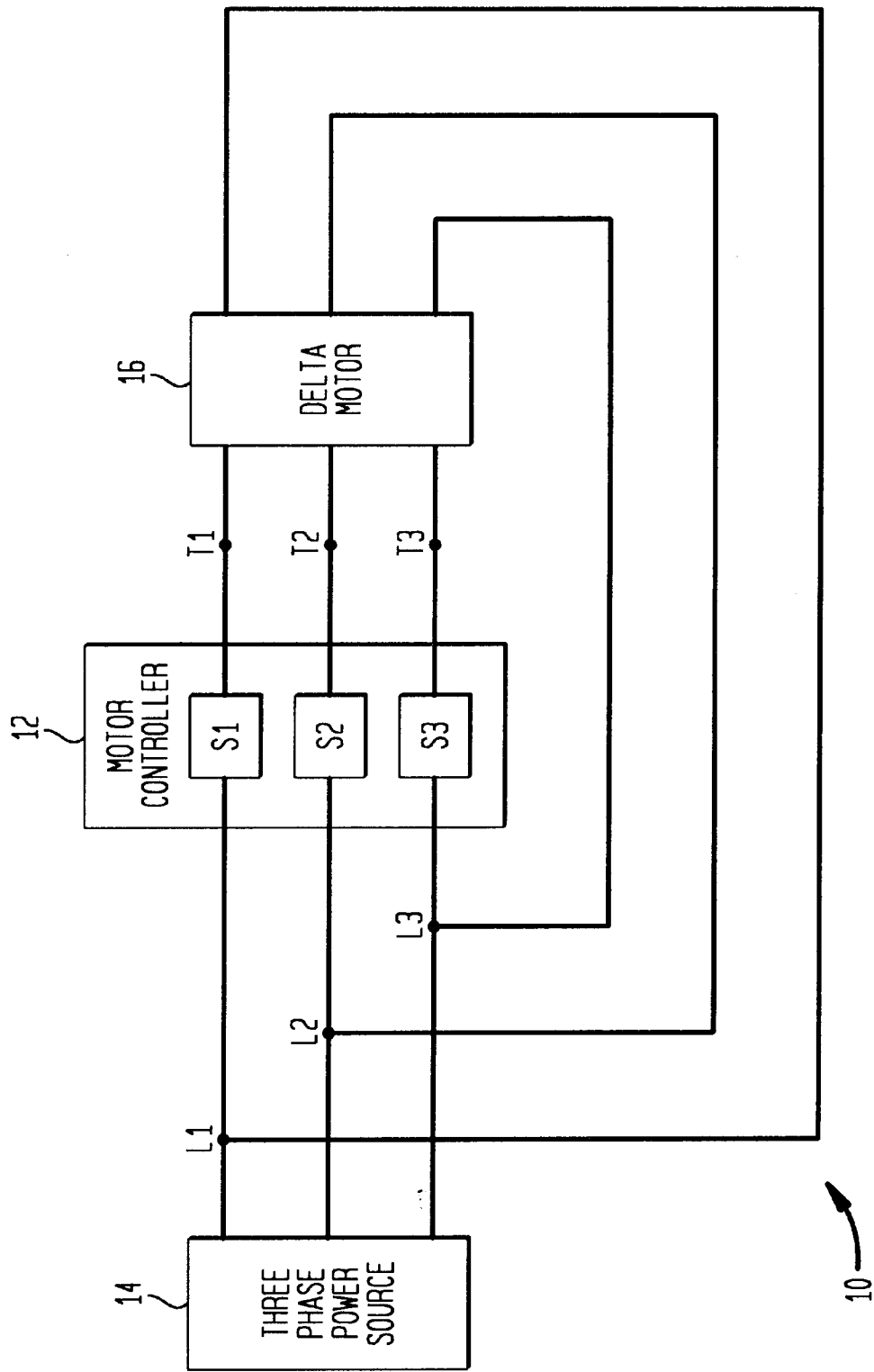
FIG. 1 shows a delta motor system including a prior art motor controller.

A diagram of a conventional delta motor system 10 including a prior art motor controller 12 is depicted in FIG. 1. The delta motor system 10 typically consists of a three phase power source 14, a delta motor 16 and a motor controller 12. The motor controller 12 generally includes a set of three control switches S1, S2, S3 for providing electrical connection between the line voltage terminals L1, L2, L3 of the three phase power source 14 and the delta motor 16. The motor controller 12 regulates the voltage applied to the delta motor 16 by selectively opening and closing the three control switches S1, S2, S3. The proper operation of the delta motor 16 is dependent upon the proper regulation of the control switches S1, S2, S3.

Figure 2:
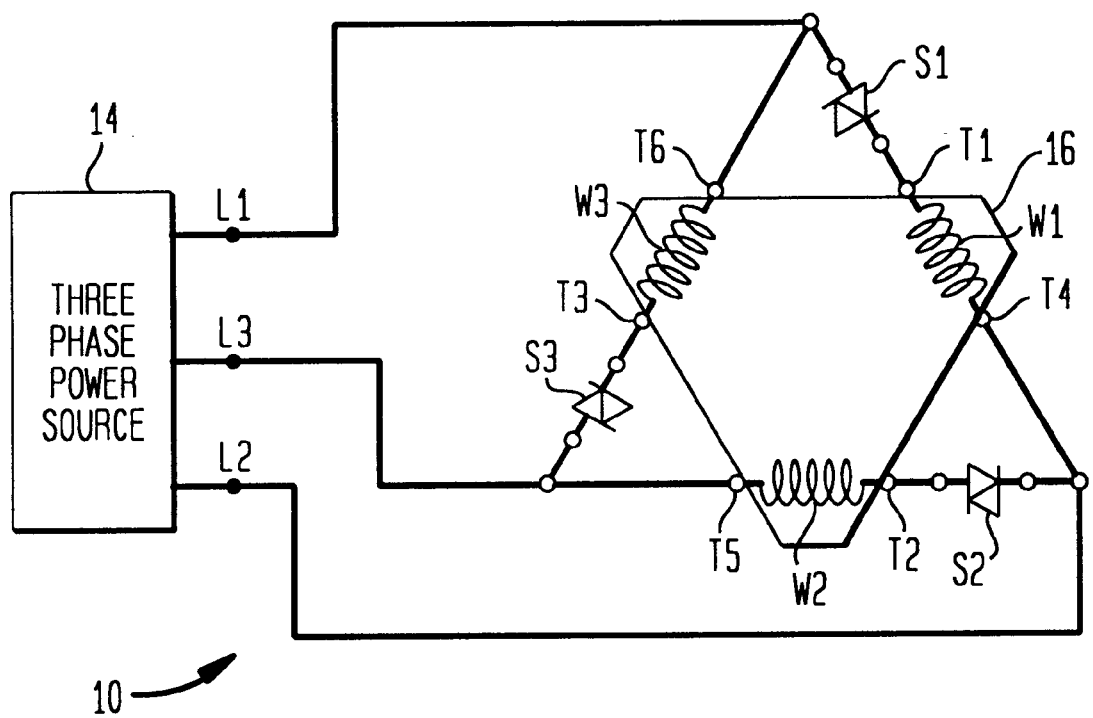
FIG. 2 illustrates the relationships between the delta motor windings, the line voltage terminals and the motor controller control switches necessary for proper motor controller operation.

FIG. 2 illustrates in detail the necessary relationships between the delta motor windings W1, W2, W3, the line voltage terminals L1, L2, L3 and the motor controller control switches S1, S2, S3 for proper motor controller operation. The motor controller's internal timing mechanisms are specifically designed to regulate the application of the three phase voltage from the three phase power source 14 to the delta motor windings W1, W2, W3 based on the illustrated wiring configuration.

The delta motor 16 consists of three windings W1, W2, W3 arranged in a delta configuration. Each winding W1, W2, W3 has a pair of associated motor terminals T1 and T4, T2 and T5, T3 and T6 respectively, that provide electrical connection to either side of each individual winding W1, W2, W3. Terminals T1, T2 and T3 are designated for connection to line voltage terminals L1, L2 and L3 respectively using the control switches S1, S2 and S3 respectively. Terminals T4, T5 and T6 are designated for connection to line voltage terminals L2, L3 and L1 respectively.

The overall layout of the control switches and the windings can be described as follows: control switch S1 and winding W1 are connected in series across line voltage terminals L1 and L2; control switch S2 and winding W2 are connected in series across line voltage terminals L2 and L3; and control switch S3 and winding W3 are connected in series across line voltage terminals L3 and L1. It is essential that the motor terminals T1, T2, T3, T4, T5, T6 be wired with the appropriate control switches S1, S2, S3 across the appropriate line voltage terminals L1, L2, L3 to enable the motor controller 12 to perform its motor torque restricting and current limiting functions.

Conventional leads are typically used to connect the delta motor windings W1, W2, W3 to the control switches S1, S2, S3 and the line voltage terminals L1, L2, L3. The electrical leads providing connection to the delta motor terminals T1, T2, T3, T4, T5 and T6 are not always clearly marked. As a result wiring mistakes during the installation process of the delta motor system 10 are not uncommon.

A common wiring error, known as a single dead ended winding configuration, occurs when the two leads of a single motor winding have been electrically coupled to the terminals of a single line voltage and the other two windings have been connected in parallel across the remaining line voltages' terminals. Under these conditions, the dead ended winding will not have any current flowing through it while the other two windings will have a potentially damaging combination of very large currents and very low motor torques.

Figure 3:
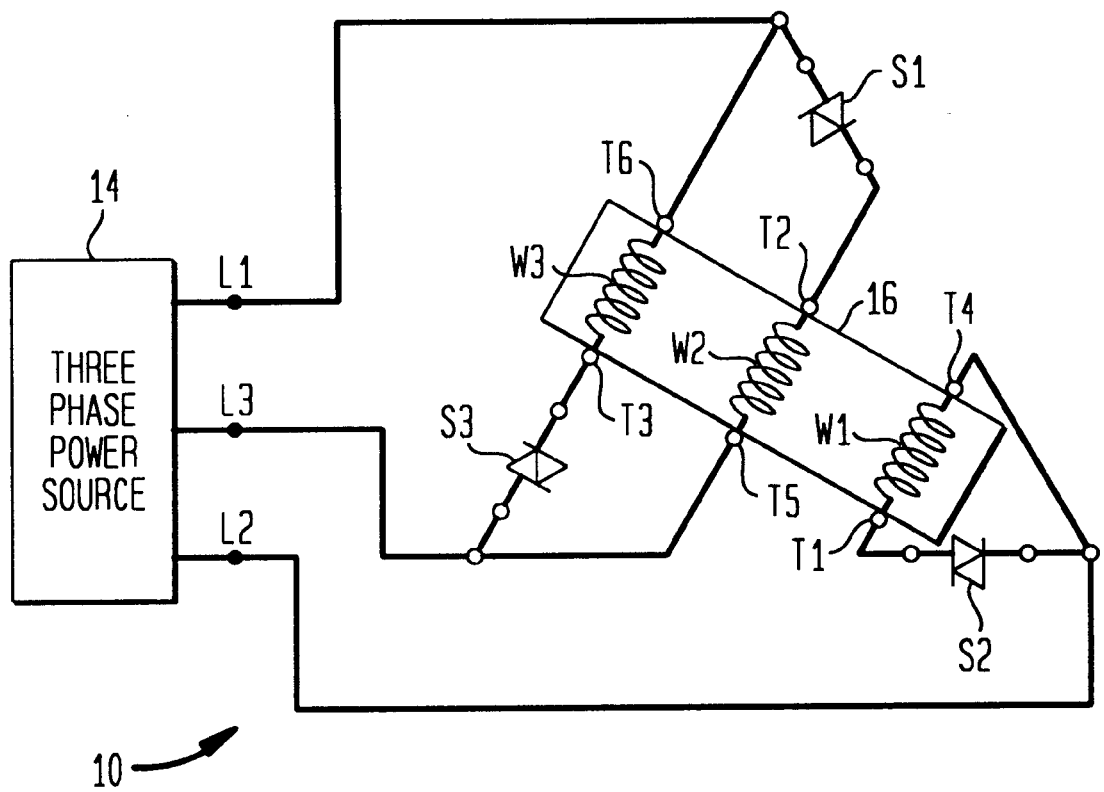
FIG. 3 shows an example of a delta motor system wired in a single dead ended winding configuration where two leads providing connection to a single winding are connected to a single line voltage.

FIG. 3 depicts an example of a single dead ended winding configuration where the winding W1 has been dead ended with no current flowing through it and windings W2 and W3 are connected in parallel and are running under overcurrent conditions. The illustrated single dead ended configuration can be described as follows: winding W1 has both terminals T1 and T4 electrically coupled to line voltage terminal L2 with control switch S2 connected between terminal T1 and line voltage terminal L2; winding W2 is electrically coupled across line voltage terminals L1 and L3 with control switch S1 connected between terminal T2 and line voltage terminal L1; and winding W3 is also electrically coupled across line voltage terminals L1 and L2 parallel to winding W2 with control switch S3 connected between terminal T3 and line voltage terminal L3.

Figure 4:
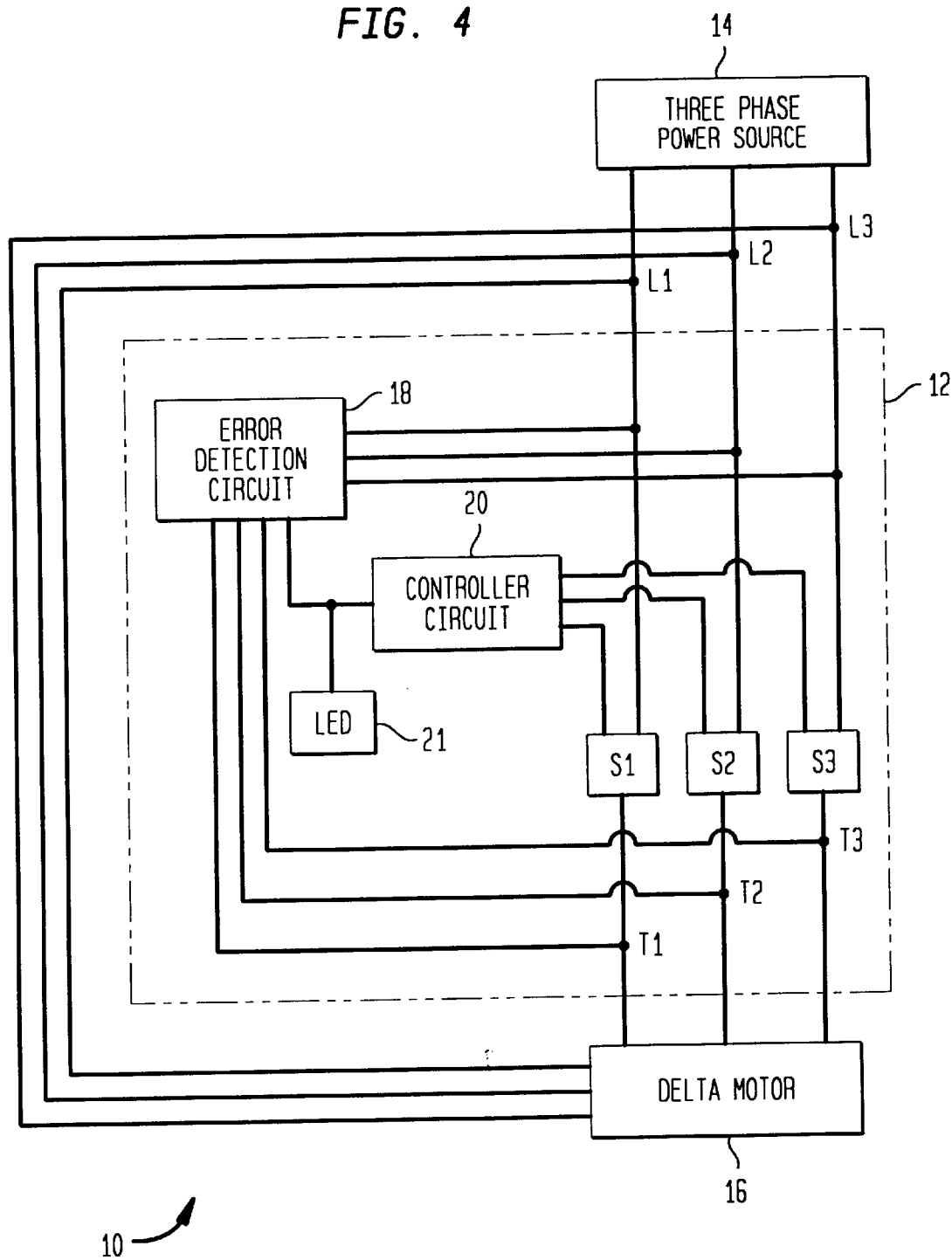
FIG. 4 depicts the motor controller according to the invention connected within a delta motor system.
Figure 5:
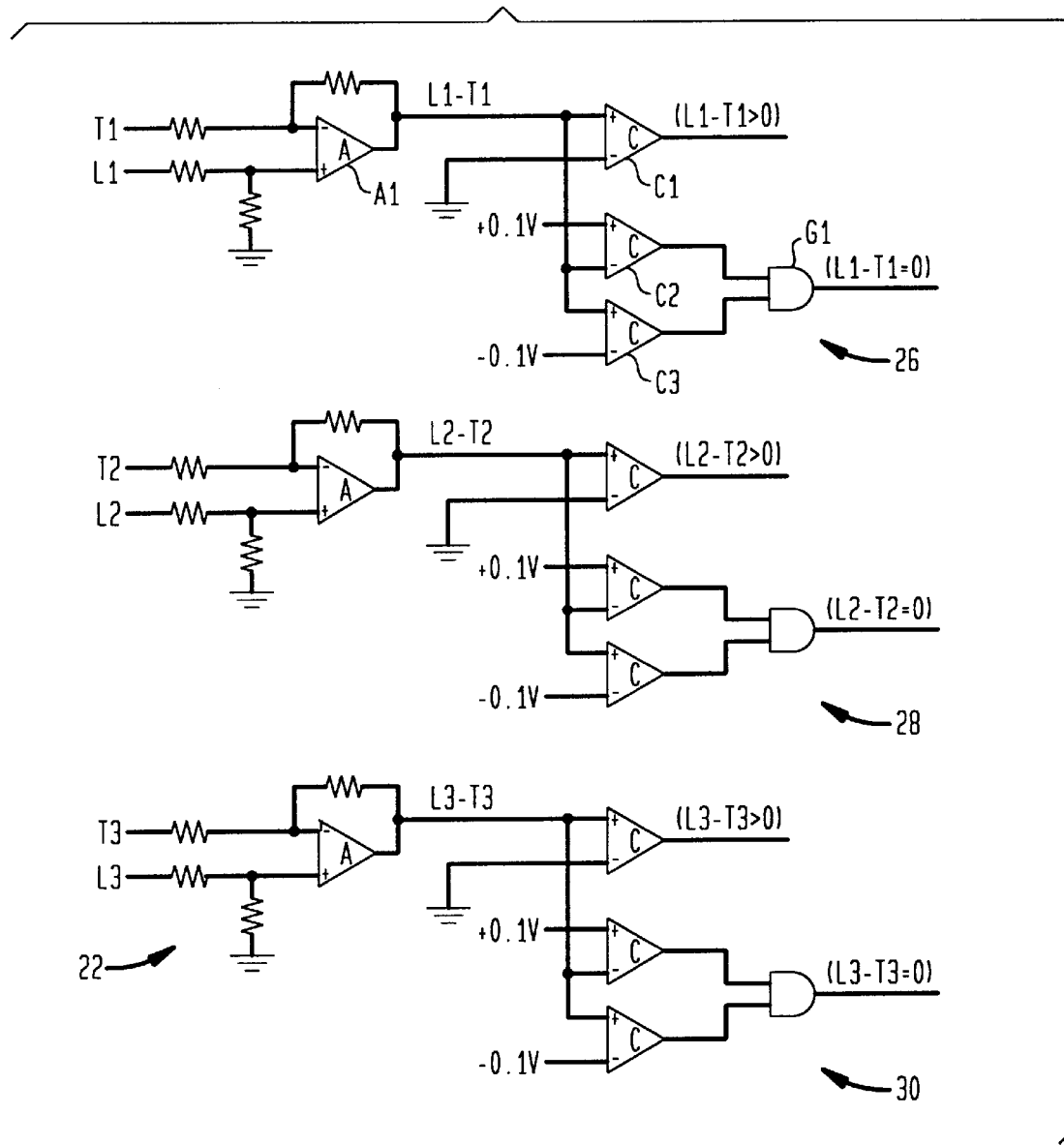
FIG. 5 is a schematic representation of the sensing circuit.

The motor controller 12 according to the invention includes an innovative error detection circuit 18. An overview of the motor controller 12 as wired within a delta motor system 10 is depicted in FIG. 4. The error detection circuit 18 is an integral part of the motor controller 12 and is electrically coupled to the line voltage terminals L1, L2, L3 and to motor terminals T1, T2, T3, across each of the individual control switches S1, S2, S3. The error detection circuit 18 manipulates the voltage readings obtained from the line voltage terminals L1, L2, L3 and the motor terminals T1, T2, T3 prior to starting the delta motor 16 to determine if both ends of a single winding have been electrically coupled to the terminals of a single line voltage and generates a fault signal in response to detecting such a condition.

The controller circuit 20, connected to each of the control switches S1, S2, S3 and the error detection circuit 18, controls the application of voltages from the three phase power source 14 to the delta motor 16 by controlling the operation of the control switches S1, S2, S3. The controller circuit 20 responds to the fault signal generated by the error detection circuit 18 by inhibiting operation of the delta motor 16. In addition, the error detection circuit 18 also directs the fault signal to an indicator circuit, such as for example an LED 21, that provides the user with notice of the single dead ended winding wiring error.

Solid state switches such as SCRs or triacs are used to perform the control switch S1, S2, S3 functions in a preferred embodiment of the invention, however, the use of alternative switching mechanisms are also considered to be within the scope of the invention. In addition, in the illustrated embodiment, the controller circuit 20 comprises a programmed microcontroller. It should be noted that alternative hardware or software implementations of the controller circuit 20 are also within the spirit of the invention.

Figure 6:
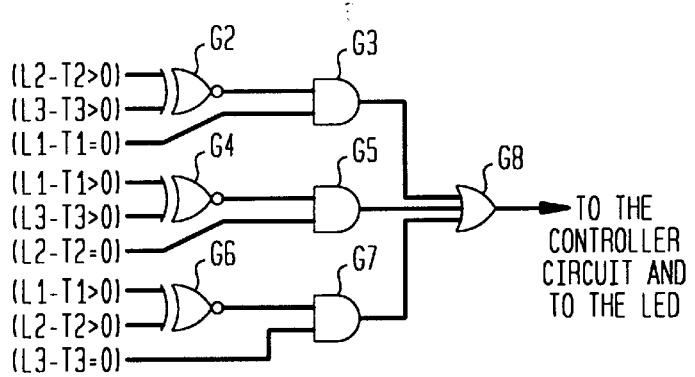
FIG. 6 is a schematic representation of the decoding circuit.

The error detection circuit 18 includes a sensing circuit 22, shown in FIG. and a decoding circuit 24, shown in FIG. 6. The sensing circuit 22 accepts the three line voltages L1, L2, L3 and the three voltages at the three motor terminals designated for control switch connections T1, T2, T3 as inputs and generates a true signal for each of the following conditions that are found to be true:

Voltages Across Control Switches

Voltage (L1-T1)>0
Voltage (L2-T2)>0

Voltage (L3-T3)>0
Voltage (L1-T1)=0
Voltage (L2-T2)=0
Voltage (L3-T3)=0

The sensing circuit 22 consists of three similar subcircuits 26, 28, 30. The first subcircuit 26 consists of an amplifier A1, three comparators C1, C2, C3 and an AND gate G1. The amplifier A1 accepts the voltage at motor terminal T1 as its negative input and the line voltage at terminal L1 as its positive input and generates the difference between the two (L1-T1), the voltage across control switch S1, as its output. This output (L1-T1), is directed into the positive input of the first comparator C1 and the negative input is connected to a ground signal. The comparator C1 compares the input signal (L1-T1), to the ground signal and generates a true signal when (L1-T1), the voltage across control switch S1, is greater than zero.

The comparator C2 accepts the amplifier A1 output, (L1-T1), as its negative input and a reference voltage +0.1 volts as its positive input and generates a true signal when (L1-T1) is less than +0.1 volts. Comparator C3 accepts the amplifier A1 output, (L1-T1), as its positive input and another reference voltage −0.1 volts as its negative input and issues a true signal when (L1-T1) is greater than −0.1 volts.

The AND gate G1 accepts the output from comparator C2 indicating whether the voltage (L1-T1) is less than +0.1 volts and the output from comparator C3 indicating whether the voltage (L1-T1) is greater than −0.1 volts as inputs and generates a true signal when both conditions are true, in other words when the voltage across the control switch S1 is greater than −0.1 volts and less than +0.1 volts. The voltage across the control switch S1, (L1-T1), is then assumed to be zero.

The second and third subcircuits 28, 30 operate similarly. The second subcircuit 28 accepts the voltages at the motor terminal T2 and at the line voltage terminal L2 as inputs and generates a first true signal when the voltage (L2-T2), the voltage across control switch S2, is greater than zero and a second true signal when the voltage (L2-T2) is between −0.1 volts and +0.1 volts. Similarly, the third subcircuit 30 accepts the voltages at motor terminal T3 and at the line voltage terminal L3 as inputs and generates a first true signal when the voltage (L3-T3) across the control switch S3 is greater than zero and a second true signal when the voltage (L3-T3) is between the values −0.1 volts and +0.1 volts.

The decoding circuit 24, shown in FIG. 6, accepts the digital output signals generated by the sensing circuit 22 and issues a true signal when a single dead ended winding configuration is detected. The decoding circuit 24 consists of three pairs of XNOR and AND gates and an OR gate G8. The three pairs of gates are: XNOR gate G2 and AND gate G3; XNOR gate G4 and AND gate G5; and XNOR gate G6 and AND gate G7. The output generated by each of these pairs are input into the OR gate G8.

The operation of the first pair of gates, XNOR gate G2 and AND gate G3, can be described as follows. The XNOR gate G2 accepts the two signals indicating if the voltage (L2-T2) and the voltage (L3-T3) are both greater than or less than zero. Since the XNOR gate G2 inverts its output, a true signal is issued when both voltages (L2-T2) and (L3-T3) are both greater than or less than zero. A true output at the XNOR gate G2 indicates that the voltages across control switches S2 and S3 are in synch.

The AND gate G3 then accepts the XNOR gate G2 output and the signal indicating if the voltage (L1-T1) is equal to zero as inputs. A true signal is generated by the AND gate G3 when the voltage (L1-T1), the voltage across the first control switch S1, is equal to zero and the voltage (L2-T2) and (L3-T3), the voltages across the second and third control switches S2 an S3 are in synch. An AND gate G3 true signal indicates that the winding connected to the first control switch S1 is in a single dead ended configuration.

The second pair of gates, XNOR gate G4 and AND gate G5, manipulate the input signals indicating if the voltages (L1-T1) and (L3-T3) are both greater than or less than zero and the input signal indicating if the voltage (L2-T2) is equal to zero in a similar manner. A true signal is generated at the output of AND gate G5 when the voltages across control switches S1 and S3 are in synch and the voltage across S2 is equal to zero indicating that the winding connected to the second control switch S2 is the dead ended winding.

Similarly, the XNOR gate G6 in the third pair also accepts the two signals indicating if the voltage (L1-T1) and the voltage (L2-T2) are both greater than or less than zero as inputs. The AND gate G7 accepts the XNOR gate G6 output and the signal indicating if the voltage (L3-T3) is equal to zero as inputs. The AND gate G7 generates a true output when the voltages across the first control switch S1 and across the second control switch S2 are in synch and the voltage across the third control switch S3 is equal to zero indicating that the winding connected to the third control switch S3 is in a single dead ended configuration.

The outputs generated by the three AND gates G3, G5 and G7 are all fed into the OR gate G8 as inputs. The OR gate then generates a true signal or a fault signal if any one of the AND gate G3, G5, G7 inputs are true indicating that one of the three windings W1, W2 or W3 has been wired in a dead ended configuration. The fault signal is then directed to the controller circuit 20 and the LED 21. In a preferred embodiment of the invention, the logical functions shown in the decoding circuit 24 are performed by the microcontroller that implements the functions of the controller circuit 20. While the illustrated embodiment focuses on a particular implementation of the error detection circuit, other equivalent hardware and software implementations of the logic disclosed also fall within the scope of the invention.

Figure 7A:
FIG. 7 illustrates the waveforms for the digital signals representative of the voltages across the individual control switches relative to the line to line voltages for a correctly wired delta motor system.
Figure 7B:
Figure 7C:
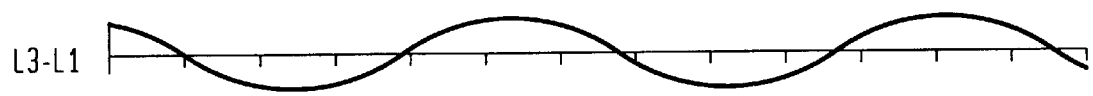
Figure 7D:
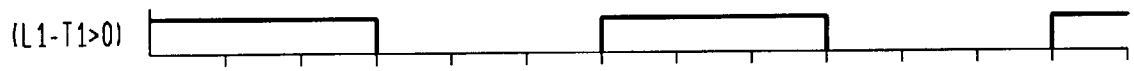
Figure 7E:
Figure 7F:
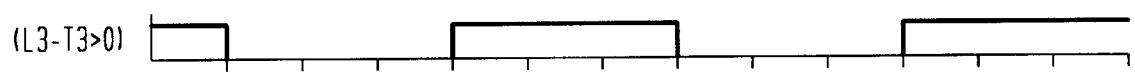

FIG. 7 illustrates the waveforms for the line to line voltages (L1÷L2), (L2-L3) and (L3-L1) and the digital signals showing when each of the voltages across the control switches (L1-T1), (L2-T2), (L3-T3) are greater than zero for a correctly wired delta motor system 10. The following observations can be made when the delta system 10 is correctly configured for operation:

(i) the first control switch S1 is connected across line voltage terminals L1 and L2 and the voltage across the first control switch (L1-T1), shown in FIG. 7(d), and the line to line voltage (L1-L2), shown in FIG. 7(a), are synchronously greater than or less than zero;

(ii) the second control switch S2 is connected across line voltage terminals L2 and L3 and the voltage across the second control switch (L2-T2), shown in FIG. 7(e), and the line to line voltage (L2-L3), shown in FIG. 7(b), are synchronously greater than or less than zero; and (iii) the third control switch S3 is connected across line voltage terminals L3 and L1 and the voltage across the third control switch (L3-T3), shown in FIG. 7(f), and the line to line voltage (L3-L1), shown in FIG. 7(c), are synchronously greater than or less than zero.

When the delta motor system 10 is configured in a single dead ended configuration, the relationships observed above are altered. FIG. 8 illustrates the waveforms for the digital signals representative of the voltages across the individual control switches (L1-T1), (L2-T2), (L3-T3) for a delta motor system 10 wired in a single dead ended winding configuration relative to the line to line voltages (L1-L2), (L2-L3), (L3-L1). These changed relationships are used by the decoding circuit 24 to identify the incorrect wiring configuration.

Figure 8A:
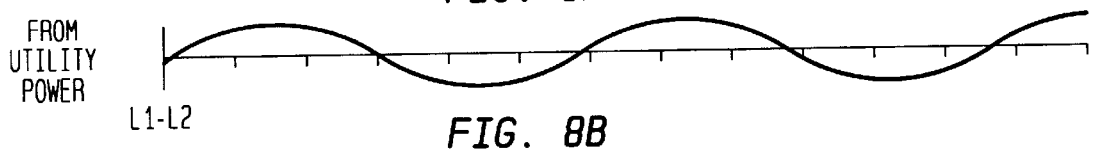
FIG. 8 illustrates the waveforms for the digital signals representative of the voltages across the individual control switches for a delta motor system for three different single dead ended winding configurations.
Figure 8B:
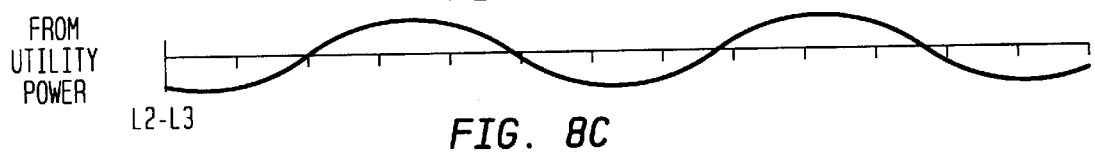

When the winding connected to the first control switch S1 is dead ended, there is no current flowing through that winding or control switch S1. Since the voltage across the control switch (L1-T1) is equal to zero, the digital signal indicating if the voltage (L1-T1) is greater than zero is true, as shown in FIG. 8(d). The other two windings and their associated control switches S2 and S3 are connected in parallel across line voltage terminals L2 and L3. The digital signals representing when the voltages (L2-T2) and (L3-T3) are both greater than or less than zero are shown in FIGS. 8(e) and (f) respectively and the waveform for line to line voltage (L2-L3) is shown in FIG. 8(b). Note that the voltages (L2-T2) and (L3-T3) across the two control switches S2 and S3 are in synch and if fact that they are in synch with the line to line voltage (L2-L3).

Figure 8C:
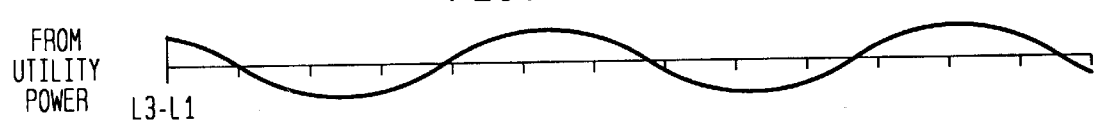
Figure 8D:
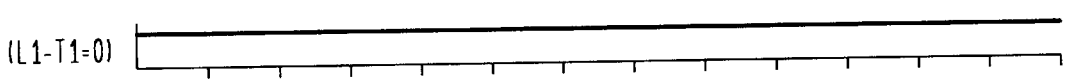
Figure 8E:
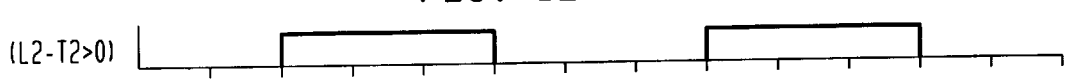
Figure 8F:
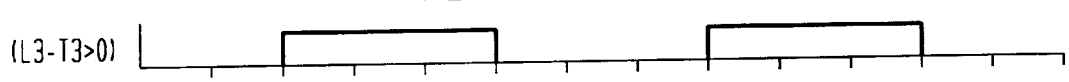
Figure 8G:
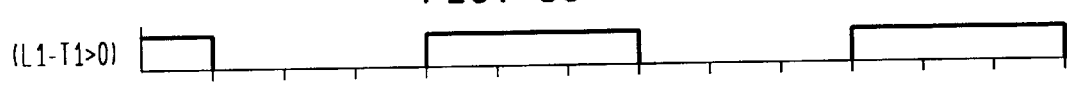
Figure 8H:
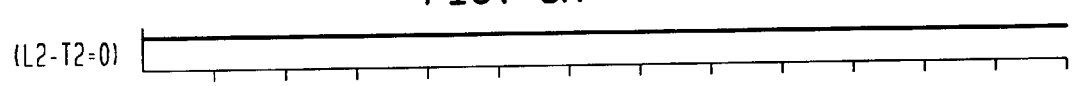
Figure 8I:
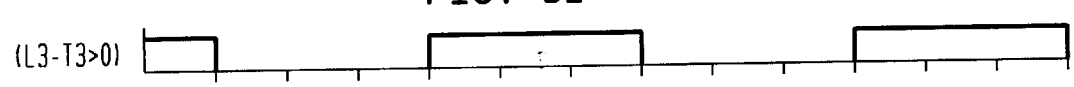
Figure 8J:
Figure 8K:
Figure 8L:
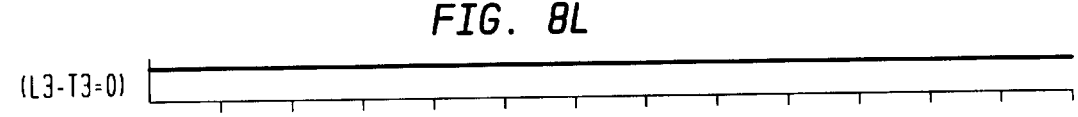

When the winding connected to the second control switch S2 is dead ended, comparable observations can be made regarding the relationships between the control switch voltages (L1-T1)—FIG. 8(g), (L2-T2)—FIG. 8(h), (L3-T3)—FIG. 8(i) and the line to line voltage (L3-L1) FIG. 8(c). A similar analysis can be made when the winding connected to the third control switch S3 is dead ended as can be seen by referring to FIG. 8(j) for voltage (L1-T1), FIG. 8(k) for voltage (L2-T2), FIG. 8(i) for voltage (L3-T3) and FIG. 8(a) for (L1-L2).

The motor controller 12 uses the error detection circuit 18 to determine if a delta motor winding is wired in a dead ended configuration. Upon detection of such a condition, the error detection circuit 18 generates a fault signal that is routed to an LED 21 to provide warning of the faulty wiring to the user and to the controller circuit 20 to inhibit operation of the delta motor 16. It will be appreciated that since the entire error detection process occurs prior to actually operating the delta motor 16, the delta motor 16 is never exposed to the potentially damaging combination of decreased motor torque and significant overcurrent conditions in the non dead ended windings. In addition, the motor controller 12 is also not placed at risk of damage.

The foregoing disclosure of specific embodiments is intended to be illustrative of the broad concepts comprehended by the invention.

I claim:

1. For use in a motor system including a multiphase power source having three supply lines and a delta motor having three windings, each winding having a first lead and a second lead, the first lead of each winding being intended for connection to a selected supply line, a motor controller comprising:
    a plurality of switching means intended for connection between selected supply lines and the second lead of selected windings; and
    an error detecting means connected across each of the switching means and operable to detect a fault condition if both the first and second leads of one of the windings are connected to a single one of the supply lines.

2. The motor controller according to claim 1, including an indicating means connected to the error detecting means for generating a fault indication in response to the fault condition.

3. The motor controller according to claim 1, wherein the plurality of switching means comprise solid state devices.

4. The motor controller according to claim 1, wherein the plurality of switching means comprise SCRs.

5. The motor controller according to claim 1, wherein the plurality of switching means comprise triacs.

6. For use in a motor system including a multiphase power source having first, second and third supply lines and a delta motor having first, second and third windings, each winding having first and second leads, the first lead of the first, second and third windings intended for connection to the second, third and first supply lines respectively, a motor controller comprising:
    a first switching means intended for connection between the first supply line and the second lead of the first winding;
    a second switching means intended for connection between the second supply line and the second lead of the second winding;
    a third switching means intended for connection between the third supply line and the second lead of the third winding; and
    an error detecting means connected across each of the switching means and operable to detect a fault condition if both the first and second leads of either the first, second or third winding are connected to a single one of the supply lines.

7. The motor controller according to claim 6, including an indicating means connected to the error detecting means and operable to generate a fault indication in response to the fault condition.

8. The motor controller according to claim 6, wherein the error detecting means further comprises a sensing means connected across each of the switching means and operable to generate a plurality of outputs representative of the voltages across each of the switching means.

9. The motor controller according to claim 8, wherein the error detecting means further comprises a decoding means connected to the sensing means and operable to detect the fault condition if the voltages across the second and third switching means are synchronously greater than or less than zero and the voltage across the first switching means is equal to zero or if the voltages across the first and third switching means are synchronously greater than or less than zero and the voltage across the second switching means is equal to zero or if the voltages across the first and second switching means are synchronously greater than or less than zero and the voltage across the third switching means is equal to zero.

10. The motor controller according to claim 6, wherein the switching means comprise solid state devices.

11. The motor controller according to claim 6, wherein the switching means comprise SCRs.

12. The motor controller according to claim 6, wherein the switching means comprise triacs.

13. For use in a motor system including a multiphase power source having first, second and third supply lines and a delta motor having first, second and third windings, each winding having first and second leads, the first lead of the first, second and third windings intended for connection to the second, third and first supply lines respectively, a motor controller comprising:
    a first switching means intended for connection between the first supply line and the second lead of the first winding;
    a second switching means intended for connection between the second supply line and the second lead of the second winding;
    a third switching means intended for connection between the third supply line and the second lead of the third winding;

a sensing means connected across each of the switching means and operable to generate a plurality of outputs representative of the voltages across each of the switching means;

a decoding means connected to the sensing means for detecting a fault condition if the voltages across the second and third switching means are synchronously greater than or less than zero and the voltage across the first switching means is equal to zero or if the voltages across the first and third switching means are synchronously greater than or less than zero and the voltage across the second switching means is equal to zero or if the voltages across the first and second switching means are synchronously greater than or less than zero and the voltage across the third switching means is equal to zero; and an indicating means connected to the decoding means and operable to generate a fault indication in response to the fault condition.

* * * * *